United States Patent [19]
Baerg

[11] 3,854,443
[45] Dec. 17, 1974

[54] GAS REACTOR FOR DEPOSITING THIN FILMS

[75] Inventor: William Baerg, Palo Alto, Calif.

[73] Assignee: Intel Corporation, Santa Clara, Calif.

[22] Filed: Dec. 19, 1973

[21] Appl. No.: 426,307

[52] U.S. Cl. .......... 118/49
[51] Int. Cl. .......... C23c 13/08
[58] Field of Search .......... 118/48–49.5; 117/106–107.2; 148/174, 175

[56] References Cited

UNITED STATES PATENTS

| | | | |
|---|---|---|---|
| 3,381,114 | 4/1968 | Nakanuma | 118/49.5 X |
| 3,511,727 | 5/1970 | Hays | 148/175 X |
| 3,517,643 | 6/1970 | Goldstein et al. | 118/48 |
| 3,696,779 | 10/1972 | Murai et al. | 118/48 |
| 3,745,969 | 7/1973 | Huffman et al. | 118/48 |

*Primary Examiner*—Morris Kaplan
*Attorney, Agent, or Firm*—Spensley, Horn & Lubitz

[57] ABSTRACT

A gas reactor for depositing thin films such as silicon dioxide, the lid of the reactor includes a plurality of concentric rings and a plurality of ports disposed between adjacent rings, a generally radial flow above the specimens is maintained in the reactor.

5 Claims, 10 Drawing Figures

PATENTED DEC 17 1974 3,854,443

GAS REACTOR FOR DEPOSITING THIN FILMS

BACKGROUND OF THE INVENTION

1. Field of the Invention

The invention relates to the field of formation of layers from a plurality of gases.

2. Prior Art

Particularly in the semiconductor industry it is common to form thin films such as silicon dioxide on substrates in the process of fabricating integrated circuits. Typically, in the reactors that are utilized to form such thin films the substrates or wafers are heated and gases such as silane and oxygen are introduced into the reactor. Upon contacting the heated surface the gases react forming the desired film such as a silicon dioxide film.

Among the reactors known in the prior art is a so-called horizontal reactor. This reactor includes an elongated tube which encloses a heated wafer holder often referred to as a susceptor. The gases are introduced into one end of the tube and flow over the heated susceptor and specimens on the susceptor. The gases react upon contact with the heated surfaces and form the desired layer. One problem with such a reactor is that as the gases pass along the tube they become depleted and hence a thinner layer may be deposited at the exhaust end of the tube than is deposited at the inlet end of the tube. Prior art means are known for compensating for this depletion, such as tilting the susceptor or by maintaining a temperature gradient along the susceptor. However, when longer reactors are utilized it becomes more difficult to achieve a uniform deposition. Also when longer reactors are utilized the gas becomes heated as it passes along the tube and gas phase deposition occurs, that is, particles form in the gas above the specimens and drop onto the specimen. Partial compensation for this is possible by utilizing a higher velocity of gas which blows the particles out the exhaust.

Vertical reactors are also known and used in the prior art. These devices, which resemble a bell jar, include a generally circular susceptor. The gases are introduced through the center of the susceptor upwards towards the top of the reactor. The gases flow from the reactor through exhaust ports disposed generally below the periphery of the heated susceptor. This reactor typically produces a uniform deposition thickness since the effects of depletion are small. However, residence time of the gases in the reactor are long because of the large volume associated with such reactors. This causes particle formation in the gas phase and these particles tend to fall onto the specimens and are not blown off because of the low gas velocities associated with such reactors.

Other reactors introduce gas through the lid of the reactor above the susceptor. In such reactors gas is removed through a plurality of exhaust ports disposed generally below and around the susceptor. These reactors are more akin to the horizontal reactor previously discussed than the vertical reactors since the gas flows from the center of the lid outward (horizontally) to the exhaust ports. It is possible to maintain a higher velocity of gas in this reactor, hence, allowing particles formed in the gas stage to be blown from the specimens.

As will be seen, the present invention improves upon the above mentioned reactors and provides an exceptionally uniform distribution of gases in the reactor, and also, provides compensation for depletion of the gases. Actual test data has shown substantial improvements in yields with the presently disclosed reactor.

SUMMARY OF THE INVENTION

A reactor for combining a first and a second gas and for depositing a film on a specimen is described. The specimen is disposed upon a heated susceptor plate which is rotated in the reactor. The lower surface of the lid of the reactor (interior to the reactor) includes a plurality of concentric annular members which extend downward into the reactor. A plurality of sets of ports are disposed between each of the annular members. Gas control means are utilized to mix gases (such as silane and oxygen) and to allow independent flow adjustment of the mixed gas into each set of ports. A screen for diffusing the flow from the ports is attached to the lower ends of the annular members. Exhaust ports are evenly distributed around the edge of the susceptor, thus causing a generally radial flow above the susceptor. The lid includes a water jacket for cooling.

With the presently disclosed flow scheme separate control of the gas directed into each of the zones defined between adjacent annular members allows a "soft" well distributed flow of gas in the reactor. The effects of depletion are readily compensated for by adjusting the flow into each zone. Additionally, since there is a substantial horizontal radial flow above the susceptor, any particles which do not form in the gas state are blown from the specimens.

DETAILED DESCRIPTION OF THE INVENTION

Figure 1:
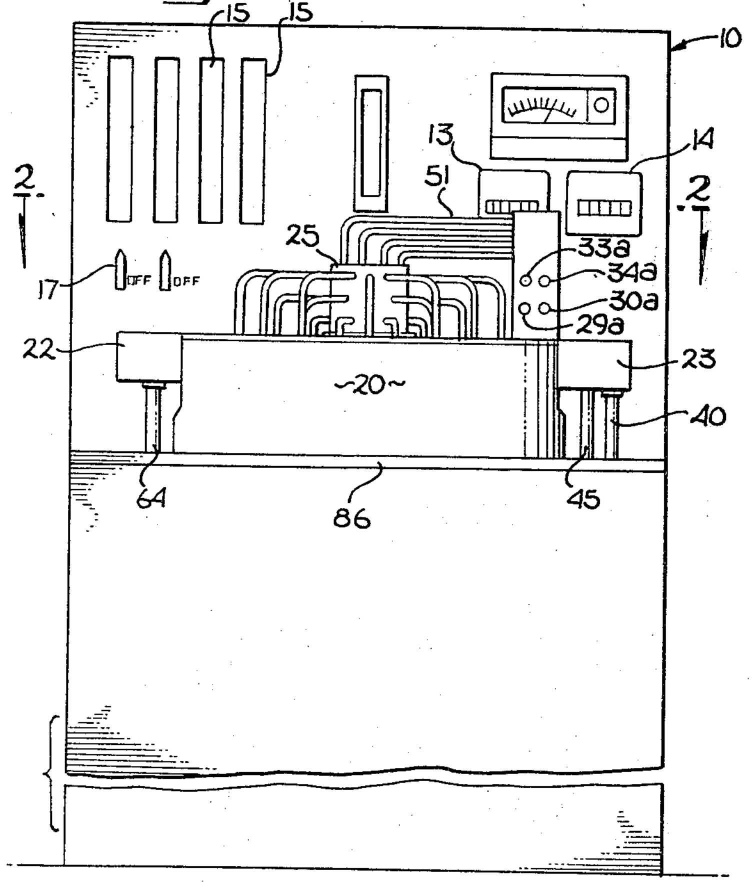
FIG. 1 is a frontal view of the reactor and illustrates both the control panel for the reactor and the reactor itself.

The invention discloses a reactor which is used for forming a layer, particularly a thin layer, on a specimen or object from gases passed above the specimen or object. While the reactor has other applications, the following description will describe an embodiment utilized for forming silicon dioxide on a plurality of wafers. The formation of silicon dioxide on wafers has particular application for metal-oxide-semiconductor (MOS) technology where the growing of silicon dioxide layers is common. These wafers are placed upon the susceptor which in turn is placed within the reactor. A plurality of these wafers are illustrated as wafers 80 on susceptor 79 in FIG. 4. In the presently preferred embodiment, two gases are utilized, one being silane ($SiH_4$) and the other oxygen ($O_2$). While the exact mechanism for the formation of the silicon dioxide is unknown, the overall reaction may be represented by the following:

$$SiH_4 + 2O_2 \underset{\Delta}{\rightarrow} SiO_2 \downarrow + 2H_2O \quad (1)$$

Both the silane and oxygen are diluted with nitrogen ($N_2$) and delivered to the reactor in separate lines. The silane is introduced at about 1 percent concentration while the oxygen is brought in at about 10 fold excess (i.e., 20 moles $O_2$ for each mole $SiH_4$). Under these conditions the reaction set forth in equation (1) proceeds negligibly below about 350°C. This prevents premature reaction in the gas lines due to diffusion of oxygen. During the deposition of the silicon dioxide the wafers are maintained at a constant temperature of approximately 400°C. Gas flow in the presently preferred embodiment for the combined gases is approximately 100 liters per minute.

Figure 7:
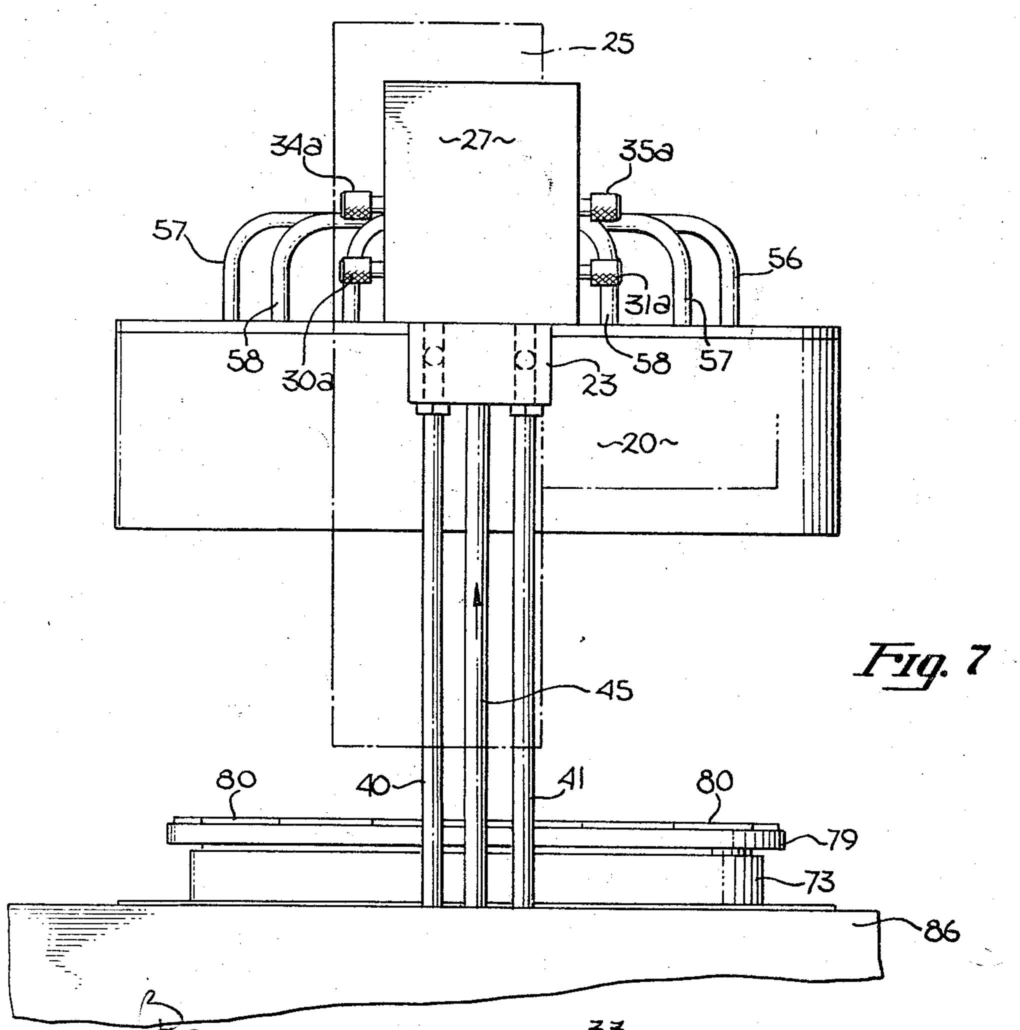
FIG. 7 is a side view of the reactor with the lid raised as seen along section line 7—7 of FIG. 3.

Referring first to FIG. 1, the reactor is mounted on a base 86. In the position illustrated in FIG. 1, that is, with the lid 20 in its lower position, the interior of the reactor is not visible. A control panel 10 is utilized in conjunction with the reactor and includes timers 13 and 14, a plurality of manometers 15 and switches 17. The placement or for that matter, the use of these devices is not critical to the present invention and they are included in FIG. 1 only to illustrate the reactor in its total environment. Referring briefly to FIG. 7, in this view of the reactor the lid 20 is in its raised position and the interior of the reactor, particularly the susceptor 79 and heating block 73 are clearly illustrated.

Figure 10:
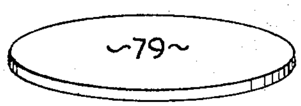
FIG. 10 is a perspective view of the susceptor.
Figure 3:
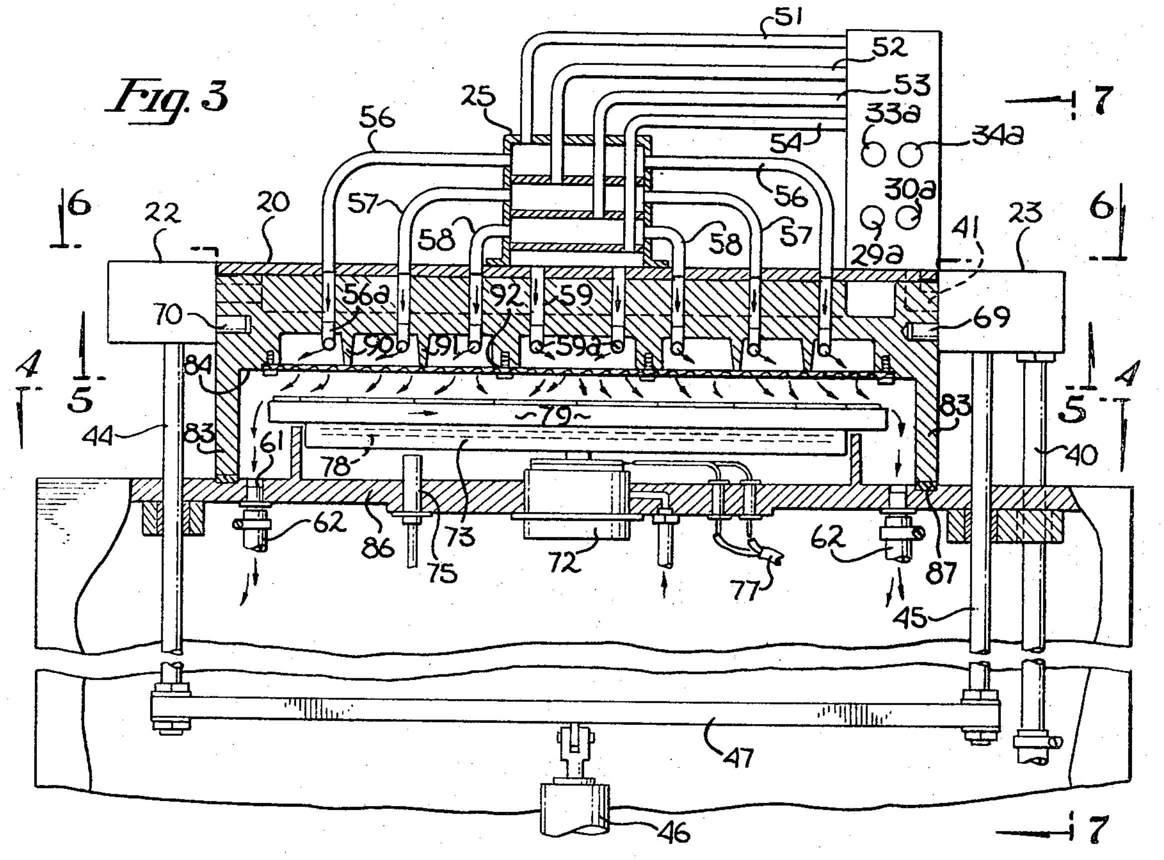
FIG. 3 is a partial cross-sectional view of the reactor taken generally through section line 3—3 of FIG. 2.
Figure 4:
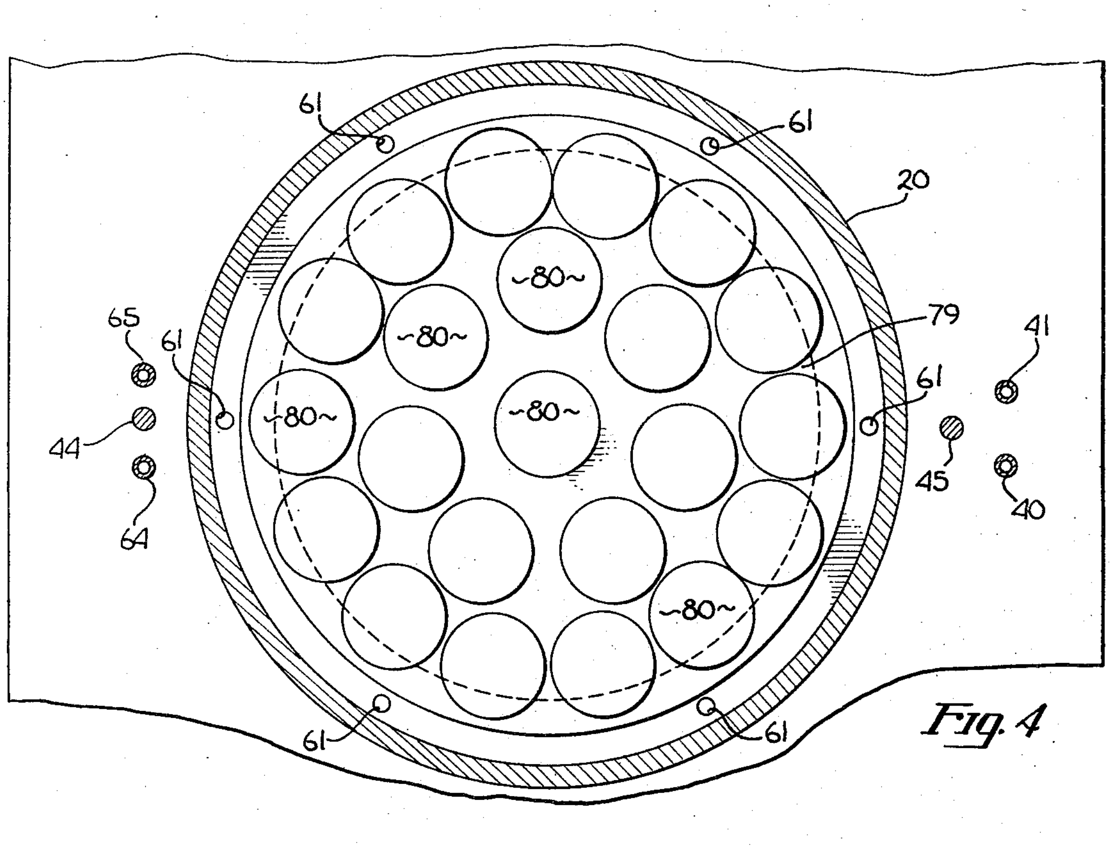
FIG. 4 is a cross-sectional view of the reactor which illustrates primarily the susceptor and wafers disposed on the susceptor taken through section line 4—4 of FIG. 3.

Referring particularly to FIG. 3, the interior of the reactor includes a heating block 73 which rotates at a speed of approximately 4 RPM when driven by motor 72. In the presently preferred embodiment, the heating block 73 is maintained at a temperature of approximately 400°C by an electrical heater 78 disposed within the heating block 73. Electrical power for the heating block is supplied through leads 77 which are interconnected with the heater 78 through slip rings. A temperature sensor 75 is utilized to sense the temperature at approximately the heating block and along with controls well known in the art, the temperature of the heating block is maintained at a predetermined temperature. The generally circular susceptor 79 illustrated in FIG. 10 is placed upon the heating block when the reactor is in use as is illustrated in FIG. 4. A plurality of wafers 80 may be then placed upon the susceptor. These wafers are heated by the heating block and maintained at the desired temperature. Thus, when the gases (silane and oxygen) strike the wafers 80 silicon dioxide is formed on the surface of the wafers.

Referring to FIGS. 3 and 4 a plurality of exhaust ports 61 are disposed evenly generally about the periphery of the susceptor 79 and are coupled to exhaust lines 62. As will be seen, the gases flow into the lid 20 of the reactor and then proceed radially outward to the exhaust ports 61. Known exhaust techniques may be utilized for exhausting the reactor through the lines 62.

Figure 5:
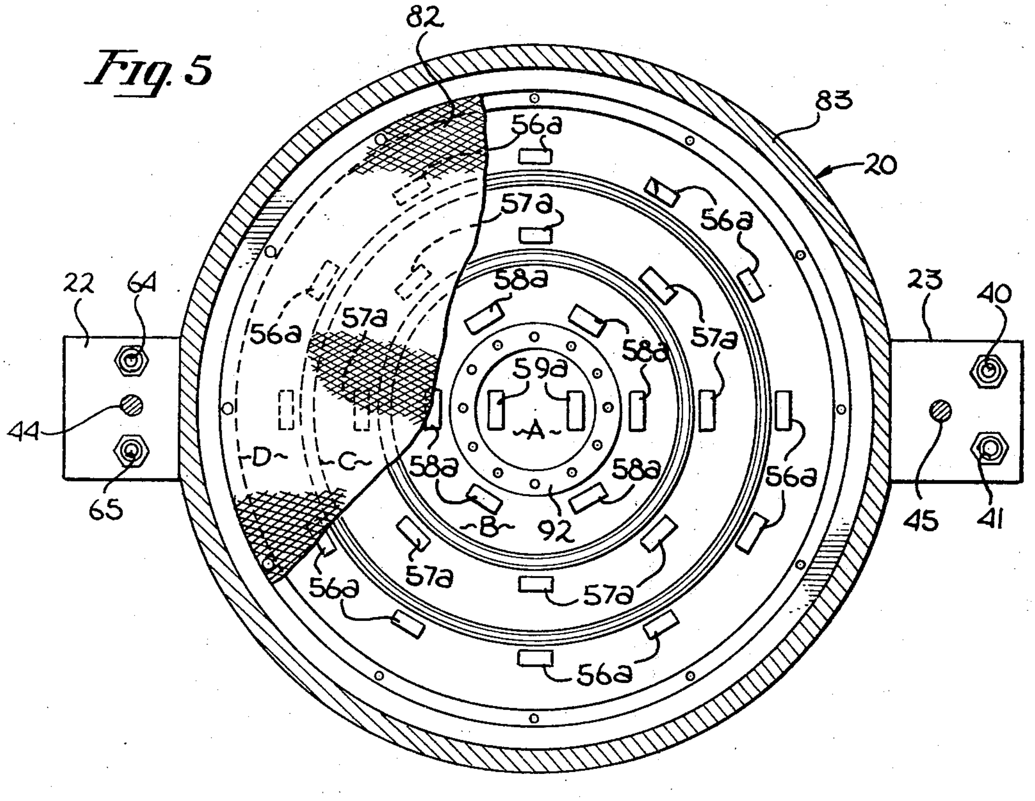
FIG. 5 is a partial cutaway view of the lower portion of the reactor lid as viewed from section line 5—5 of FIG. 1.

Referring to FIGS. 1, 2, 3, 5, 6 and 7, the lid 20 is a generally cylindrical member and includes an annular rim 83. The rim 83 is adaptable for contacting a gasket 87 disposed in the base 86 such that the interior of the reactor may be sealed. Referring particularly to FIGS. 3 and 5, the lower interior surface of the lid 20 includes a plurality of concentric rings or annular members 90, 91 and 92 which extend downward into the reactor. As will be discussed, the spaces between each of these annular members and between member 90 and rim 83, and also the volume within the interior of annular member 92 all comprise gas zones or regions into which gas is directed during the operation of the reactor. In the presently preferred embodiment four such zones are utilized illustrated as zones A, B, C and D in FIG. 5. The number of zones utilized is not critical and reactors with three and four zones have been successfully run, although in the presently preferred embodiment four zones are utilized. The annular members are arranged in the presently preferred embodiment such that the ratio of the areas between members (when the zones are examined at screen 82) are approximately 1-3-5-7 for areas A-B-C-D, respectively.

An ordinary generally circular stainless steel or aluminum screen 82 is disposed at the lower ends of the annular members. The screen 82 is coupled to the shoulder 84 of rim 83, and also, at the interior annular member 92 by a plurality of bolts. In the presently preferred embodiment, the screen 82 includes a plurality of apertures of approximately 0.03 inches in diameter. The screen is used to diffuse gases as they pass from the lid. The screen 82 is approximately one half inch above the susceptor 79 when the lid is in its lower position in the presently preferred embodiment.

The lid 20 is pivotally coupled to a pair of ears 22 and 23 at pins 70 and 69, respectively. In the presently preferred embodiment the lid 20 may be rotated upon these pins, this allows the inside of the lid to be readily examined and cleaned. The ears 22 and 23 as is most clearly seen in FIG. 3 are supported by lift rods 44 and 45, respectively; the lower ends of the lift rods are coupled to an actuator bar 47. The actuator bar 47 is coupled at approximately its mid point to an actuator 46. As is readily apparent, actuator 46 is utilized to lift the lid to its upper position, that position being shown in FIG. 7 and to lower the lid.

Figure 6:
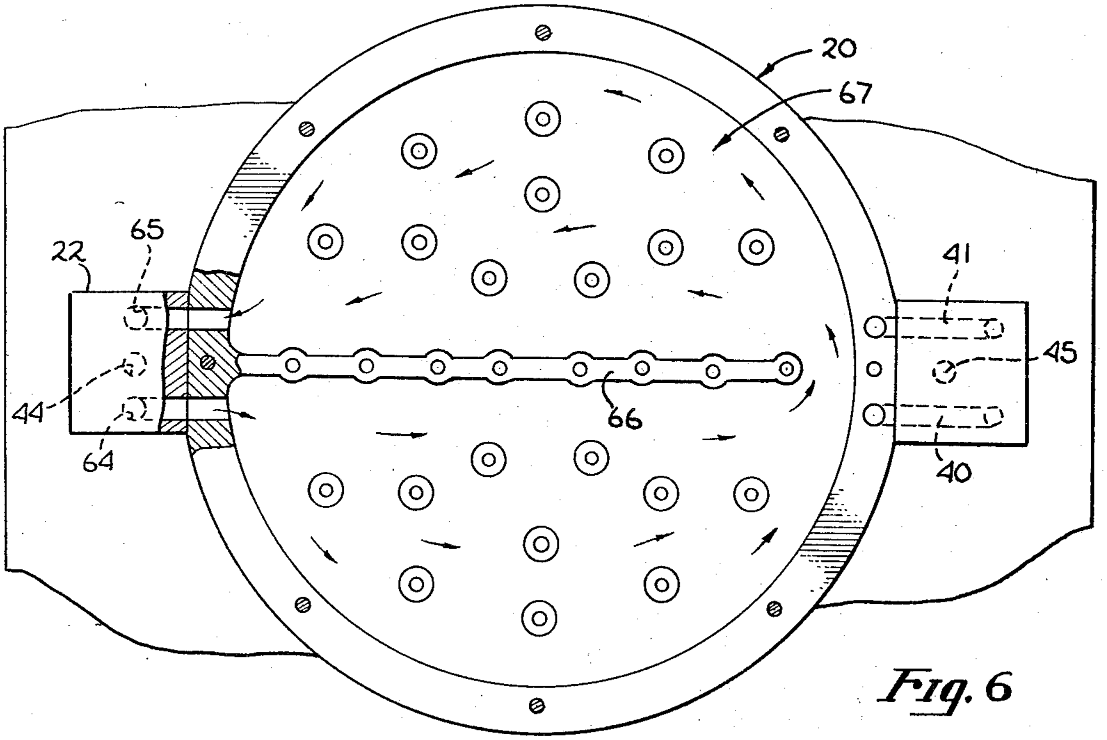
FIG. 6 is a cross-sectional view of the reactor lid generally taken through section line 6—6 of FIG. 3 and primarily illustrates the water jacket used to cool the reactor lid.

The interior of the lid 20 includes a water jacket as is illustrated in FIG. 6. The inlet water line 64 extends through the base 86 into the ear 22 as does the outlet water line 65. The water circulates within the water jacket 67 about the baffle 66. In the presently preferred embodiment the lid 20 is maintained as close to room temperature as possible. It will be appreciated that if the lid 20 becomes heated (through convection from the heater block 73) the silane and oxygen, when contacting the lid would then form silicon dioxide, or silicon dioxide particles would form near the lid, and these particles would drop onto the wafers. Obviously, the particles if not blown from the wafers by the radial flow, will cause an irregularity which generally destroys the value of a circuit disposed on the wafer.

The lid 20 may be fabricated from metal such as steel or aluminum utilizing known techniques.

Referring to FIGS. 1, 2, 3, 5, 7 and 8, the gas distribution system for the reactor is illustrated. The inlet gases for the reactor are brought to the lid 20 through lines 40 and 41. These lines pass through the base 86 and are coupled to ear 23. Line 40 is the inlet silane line while line 41 is the inlet oxygen line. These lines at their lower ends are coupled to sources of gas as is commonly done in the prior art. Lines 40 and 41 first enter the gas control box 27. Within the gas control box 27 the silane and oxygen are mixed and the flow rates controlled. The outlet lines 51, 52, 53 and 54 from the box 27 are coupled to the manifold 25 and then distributed into the zones A, B, C and D of the lid 20 through a plurality of lines as will be described.

Figure 8:
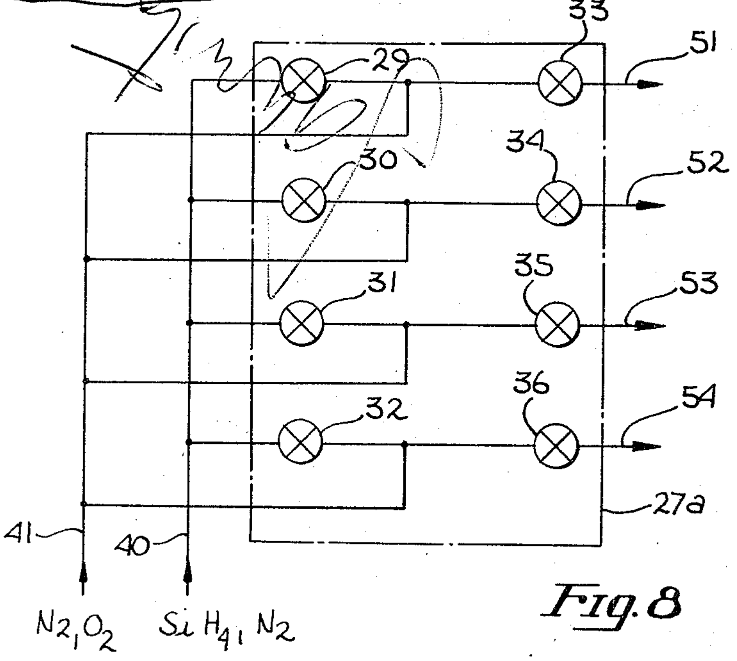
FIG. 8 is a schematic of the gas control box.

The gas control box 27 is illustrated schematically in FIG. 8 within broken line 27*a*. The inlet silane line which also includes the carrier gas, nitrogen, is coupled to the inlet of needle valves 29, 30, 31 and 32. The outlet from valves 29 through 32 are coupled to the inlet oxygen line 41, thus, allowing the silane and oxygen to be mixed at the outlet of valves 29 through 32. The combined gases then flow through needle valves 33, 34, 35 and 36. The outlet from these valves are lines 51, 52, 53 and 54, respectively, which couple the gas control box 27 with the manifold 25. In the presently preferred embodiment valves 29 through 36 each include a vernier knob. These knobs are designated in the drawings with the same number as the valve and with the addition of the letter *a*. Thus, the knob for valve 35 is shown in FIG. 7 as 35*a*. It is desirable to have vernier settings on each valve so that precise adjustments in flow may be made, and once made, may be repeated.

Figure 9:
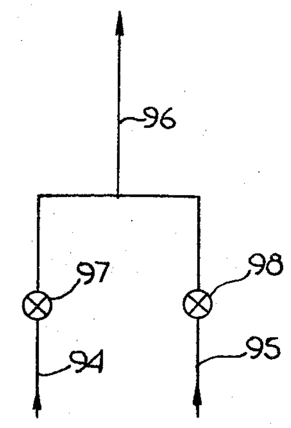
FIG. 9 is an alternate embodiment wherein different gas flow means are utilized.
Figure 2:
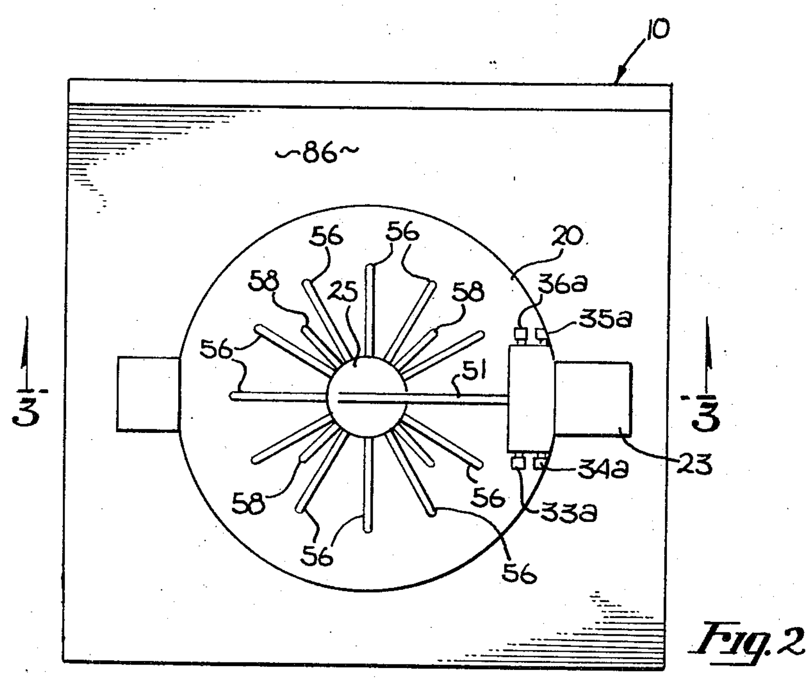
FIG. 2 is a cross-sectional view of the reactor and control panel taken through section line 2—2 of FIG. 1.

While in the presently preferred embodiment a first valve is used to control the flow of silane into an outlet line and a second valve is used to control the combination of oxygen and silane as illustrated in FIG. 8, other flow control means may be utilized. One alternate embodiment for flow control is illustrated in FIG. 9. In FIG. 9 a first inlet line 94 is coupled to a valve 97, while a second inlet line 95 is coupled to a valve 98. The outlets from valves 97 and 98 are coupled to a common outlet line 96. Line 94 and 95 may carry gases such as silane and oxygen, respectively, and through valves 97 and 98 flow of each of these gases may be separately controlled into the outlet line 96. It will be appreciated, in a reactor having four regions, such as the reactor illustrated, four sets of valves and lines such as shown in FIG. 9 may be required.

The manifold 25 defines four regions, one for supplying a gas into each of the zones A, B, C and D of the reactor lid. One region of the manifold 25 permits line 51 to communicate with a plurality of lines 56, the second region of the manifold 25 permits line 52 to communicate with a plurality of lines 57, the third region of the manifold 25 permits lines 53 to communicate with lines 58, and the last region of the manifold 25 permits lines 54 to communicate with lines 59.

Referring to FIGS. 2, 3, 5 and 7, the distribution of gas within the lid 20 from the manifold 25 may be readily understood. The 12 lines 56, each of which are coupled to the manifold 25 at one end each terminate in a T connector 56*a*. The T connectors 56*a* each have the center portion of the T coupled to the line 56 and the ends of the T placed within zone D between the rim 83 and the annular member 90. The T connectors 56 are evenly spaced, circumferentially, within zone D approximately abutting member 90 with the ends of the T approximately parallel to the screen 82. Thus, each T connector 56*a* includes a pair of ports which communicate with zone D and which inject gas into the zone in a direction generally parallel to the screen 82.

In a similar manner line 52 enters the manifold 25 and allows the gas from that line to be distributed through the plurality of lines 57 and into the eight T connectors 57*a*. These T connectors are disposed in zone C between the annular members 90 and 91, adjacent to member 91. Similarly, line 53 is coupled through the manifold 25 to a plurality of lines 58 which terminate in the six T connectors 58*a*. These T connectors are disposed within zone B between annular members 91 and 92 and generally adjacent to member 92. Lastly, line 52, through manifold 25, is coupled to a pair of lines 59. Each of these lines terminate within zone A (which is defined by member 92) in a pair of T connectors 59*a*.

Thus, the gas which flows into each of the zones A, B, C and D may be independently controlled through the valves shown in FIG. 8. Not only is it possible to control the total flow into each zone, but also, the proportions of the silane and oxygen. With the exhaust ports 61 arranged about the periphery of the susceptor 79 the flow from each of the zones into the six exhaust ports 61 is generally radial. This flow which is generally horizontal across the surface of the wafers tends to blow particles from the wafers.

The presently disclosed reactor, particularly with the lid design provides a soft flow of the silane and oxygen above the surface of the wafers. The present flow distribution scheme reduces eddy currents and convection currents within the reactor. As is the case with other prior art reactors, the flow is laminar. Depletion is minimized since new gas is added at each of the zones. While theoretical attempts have been made to determine the adjustments on each of the valves controlling the flow into the reactor it has been found that the most satisfactory method for setting the valves is through trial and error. After the proper flow into each zone has been determined these settings are maintained until the yield from the reactor has deteriorated.

In use after the wafers and susceptors have been placed within the reactor and the lid has been closed the interior of the reactor is preheated and purged. Following this, while the susceptor is being rotated, the silane and oxygen (with the carrier gas) are introduced in the reactor for a period of time which is a function of the thickness of silicon dioxide required on the wafers. After each "run" the screen in the lid is cleaned typically with a vacuum cleaner. Less frequently, the screen may be removed and the interior of the lid also cleaned.

Thus, a reactor has been disclosed which is particularly adaptable for depositing silicon dioxide on a plurality of wafers. The lid defines a plurality of gas zones or regions into which independent control of gases is accomplished. This system of flow control, in addition to producing a soft flow with substantially no eddy or convection currents, allows for "makeup" gases to be added for compensation of depletion.

I claim:

1. In a reactor for vapor depositing, comprising:

a bell member and a horizontally disposed platform defining a reaction chamber;

a horizontally disposed rotatable susceptor supported on said platform and adapted to support at least one substrate thereon;

means to controllably heat said susceptor;

means to rotate said susceptor;

means to relatively translate said bell member and platform whereby said chamber is selectively opened or sealed;

a plurality of concentric, horizontally spaced annular wall elements disposed within said bell member and depending from the roof thereof whereby defining a central chamber zone and a plurality of annular chamber zones thereabout;

said zones coextensively overlying said susceptor;

a diffuser screen extending across the open ends of each said chamber zone;

a plurality of reactor exhaust means disposed at the periphery of said platform;

a plurality of inlet ports in each of said zones for feeding the gas of said deposition vapor and whereby said gas is uniformly dispensed through said diffuser screen, radially swept across the at least one substrate to effect said deposition and passed through said exhaust means.

2. The reactor defined in claim 1 wherein means feeding said gas to each of said inlet ports, comprises an inlet line for a first gas having a first valve disposed in said line, an inlet line for a second gas coupled to said first line such that such first gas and second gas are combined at the outlet of said first valve and an outlet line with a second valve, said outlet line directing the combined gases to said plurality of ports.

3. The reactor defined in claim 1 wherein means feeding said gas to each of said inlet ports, comprises a first inlet line including a valve, a second inlet line including a valve and an outlet line in which such first gas and second gas are combined, said outlet line being coupled to said ports.

4. The reactor defined by claim 1 wherein each plurality of ports is evenly distributed circumferentially in said lid.

5. The reactor defined by claim 1 wherein each port includes a T-connector with the center of said T-connector being coupled to an inlet source of gas and with the ends of said T-connector being disposed generally circumferentially in said lid.

* * * * *